US012625539B2

(12) United States Patent
Gao et al.

(10) Patent No.: US 12,625,539 B2
(45) Date of Patent: May 12, 2026

(54) METHOD AND SYSTEM FOR CONTROLLING A MEMORY DEVICE

(71) Applicant: Imagination Technologies Limited, Kings Langley (GB)

(72) Inventors: Zhi Gao, Hertfordshire (GB); Suneel Varma Uppalapati Venkata, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 116 days.

(21) Appl. No.: 18/119,918

(22) Filed: Mar. 10, 2023

(65) Prior Publication Data

US 2023/0333627 A1    Oct. 19, 2023

(30) Foreign Application Priority Data

Mar. 10, 2022    (GB) ..................................... 2203363

(51) Int. Cl.
*G06F 1/3234*        (2019.01)
*G06F 11/30*        (2006.01)
(52) U.S. Cl.
CPC ........ *G06F 1/3275* (2013.01); *G06F 11/3037* (2013.01); *G06F 11/3075* (2013.01)
(58) Field of Classification Search
CPC .. G06F 1/3275; G06F 11/3075; G06F 1/3225; G06F 1/3228; G11C 5/148
See application file for complete search history.

(56) References Cited

U.S. PATENT DOCUMENTS

| | | | | |
|---|---|---|---|---|
| 9,021,275 B1* | 4/2015 | Greenan | ............... | G06F 3/0634 |
| | | | | 713/300 |
| 2004/0098631 A1* | 5/2004 | Terrell, II | ............... | G06F 1/324 |
| | | | | 713/322 |
| 2011/0035613 A1* | 2/2011 | Rancurel | ............... | G06F 1/3203 |
| | | | | 713/323 |
| 2011/0291748 A1 | 12/2011 | Li et al. | | |
| 2011/0320847 A1* | 12/2011 | Cheung | ................. | G06F 1/3275 |
| | | | | 713/340 |
| 2012/0042182 A1* | 2/2012 | Fulkerson | ............. | G06F 1/3268 |
| | | | | 711/135 |

(Continued)

FOREIGN PATENT DOCUMENTS

CN        113885692 A        1/2022

OTHER PUBLICATIONS

"Lienig, J., & Scheible, J. (2020). Fundamentals of layout design for electronic circuits, 2020, Springer Cham, 1" (Year: 2020).*

*Primary Examiner* — Hyun Soo Kim
(74) *Attorney, Agent, or Firm* — Potomac Law Group, PLLC; Vincent M DeLuca

(57)        ABSTRACT
A method of controlling a memory device in which the memory device has a normal mode in which the memory device is operable, and a power save mode in which the memory device is inoperable and consumes lower power than the normal mode. The method includes determining a metric based on the time spent by the memory device in at least one previous inactive period. The method further includes comparing the metric with a threshold. Further method includes in response to determining that the metric is lower than the threshold causing the memory device to remain in the normal mode throughout a subsequent inactive period.

20 Claims, 6 Drawing Sheets

(56) References Cited

U.S. PATENT DOCUMENTS

| | | | |
|---|---|---|---|
| 2012/0151238 A1* | 6/2012 | Yang | G06F 1/3275 |
| | | | 713/320 |
| 2016/0077871 A1* | 3/2016 | Kaplan | G06F 1/3246 |
| | | | 718/102 |
| 2016/0100367 A1* | 4/2016 | Modan | H04W 52/0258 |
| | | | 370/311 |
| 2020/0201417 A1 | 6/2020 | Park et al. | |
| 2020/0326766 A1* | 10/2020 | Tsirkin | G06F 9/4893 |
| 2021/0200299 A1* | 7/2021 | Liang | G06F 3/0604 |
| 2021/0247916 A1* | 8/2021 | Jung | G06F 1/3225 |
| 2022/0221925 A1* | 7/2022 | Wang | G06F 11/3438 |

* cited by examiner

METHOD AND SYSTEM FOR CONTROLLING A MEMORY DEVICE

BACKGROUND

Memory devices are devices for storing data or information which are to be processed by computing devices. Some memory devices that are directly accessible by processors in the computing devices may be known as main memory or primary memory devices. Such primary memory devices are semiconductor memory blocks or chips that are connected to the processor or integrated with the processor on an SoC. There are also other memory devices such as hard disk, solid state drives (SSD), CD, floppy disk, and the like which may be known as external memory devices (or secondary memory) which are not directly accessible by the computing devices.

Examples of primary memory devices include Random Access Memory (RAM), and a permanent storage device called a Read-Only Memory (ROM). The RAM is principally used as a temporary storage by operating systems and applications in the computing device. The operating system and the application read data from and write data into the RAM while performing various functions. Some examples of RAM include dynamic RAM (DRAM), static RAM (SRAM), Synchronous Dynamic RAM (SDRAM), Single Data Rate Synchronous Dynamic RAM (SDR SDRAM), Double Data Rate Synchronous Dynamic RAM (DDR SDRAM) etc. There are also other kinds of primary memory devices such as flash memory and register banks.

The primary memory devices of the computing device such as RAM, flash memory and register banks enter into various power modes depending on the operation of the computing device. The different power modes may include a normal mode of operation, a shutdown mode and various power save modes which may be also referred to as self-refresh mode, sleep mode, standby mode, low power mode, ultra-low power mode, etc. The computing devices comprises a memory controller that manages the operation of primary memory devices of the computing device. The memory controller manages the flow of data going to and from the main memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first aspect provides a method of controlling a memory device, the memory device having a normal mode in which the memory device is operable and a power save mode in which the memory device is inoperable and consumes lower power than the normal mode. The method comprises determining a metric based on the time spent by the memory device in at least one previous inactive period, comparing the metric with a threshold, and in response to determining that the metric is lower than the threshold causing the memory device to remain in the normal mode throughout a subsequent inactive period.

The method may comprise, in response to determining that the metric is lower than the threshold, causing the power save mode to be disabled, so that the memory cannot be placed in the power save mode and instead remains in the normal mode in a subsequent inactive period.

A second aspect provides a memory controller for controlling a memory device, the memory device having a normal mode in which the memory device is operable, and a power save mode in which the memory device is inoperable and consumes lower power than the normal mode. The memory controller comprises a calculation module configured to determine a metric based on the time spent by the memory device in at least one previous inactive period, a comparator configured to compare the metric with a threshold, and a driver configured to, in response to determining that the metric is lower than the threshold, cause the memory device to remain in the normal mode throughout a subsequent inactive period.

The memory controller may be embodied in hardware on an integrated circuit. There may be provided a method of manufacturing, at an integrated circuit manufacturing system, a memory controller. There may be provided an integrated circuit definition dataset that, when processed in an integrated circuit manufacturing system, configures the system to manufacture a memory controller. There may be provided a non-transitory computer readable storage medium having stored thereon a computer readable description of a memory controller that, when processed in an integrated circuit manufacturing system, causes the integrated circuit manufacturing system to manufacture an integrated circuit embodying a memory controller.

There may be provided an integrated circuit manufacturing system comprising: a non-transitory computer readable storage medium having stored thereon a computer readable description of the memory controller; a layout processing system configured to process the computer readable description so as to generate a circuit layout description of an integrated circuit embodying the memory controller; and an integrated circuit generation system configured to manufacture the memory controller according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
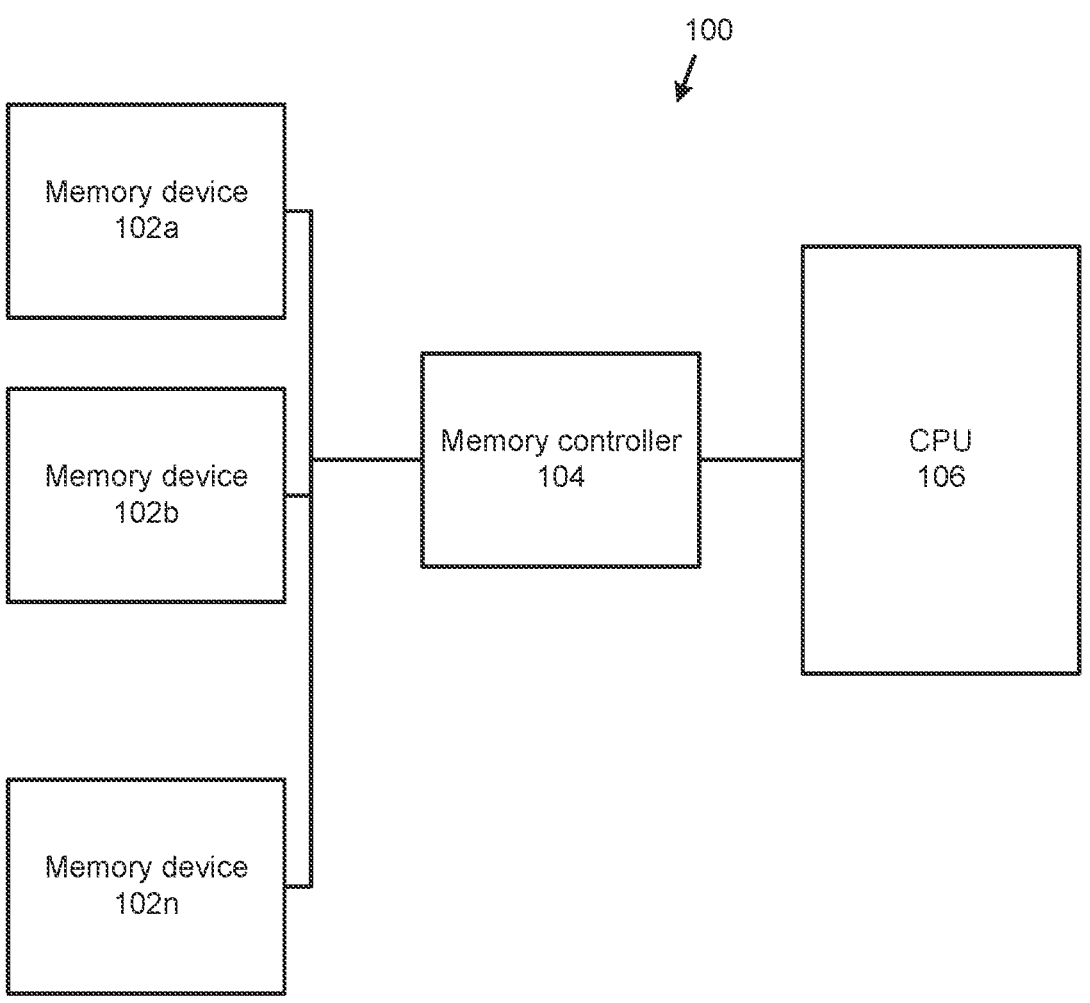
FIG. 1 is a block diagram of a computing device.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As discussed earlier, the primary memory devices of the computing device such as various types of RAM, flash memory or register banks, enter into various power modes depending on the operation of the computing device. A memory controller manages the memory devices and controls the entry of the memory device into various power modes.

When the computing device is powered on, the memory devices operate in a normal mode in which the memory devices are operable. For example, in the normal mode, the operating system and applications in the computing device may perform memory operations such as reading from and writing to a memory device. Thus, in normal mode when the memory device is active, the memory device consumes power hereinafter referred to as active power (or peak power). In the normal mode, when a processor is not performing any memory operations/completes performing memory operations, the memory device could also become inactive. In such cases, the memory device would consume a default power hereinafter referred to as inactive power. The inactive power is consumed due to the leakage current through the transistors in the chip when the memory is powered-up but inactive.

Typically, when the memory device is inactive i.e. not performing any operations, for a certain duration or time period, based on the settings of the computing device, the memory device may go to a power save mode. In power save mode, the memory consumes a lower power compared to power consumed in the normal mode of operation. Hence, power save mode of the memory devices is intended to save power.

However, when the memory device enters into a power save mode, the memory device consumes additional power to switch from one mode to another which is explained in detail below. Therefore, if the memory device switches from normal mode to power save mode and backwards very often, a considerable amount of additional power is consumed to enable the back and forth switching. Thus, the memory device may eventually end up consuming more power in a power save mode compared to remaining in a normal mode of operation.

FIG. 1 illustrates a computing device 100 comprising a plurality of memory devices 102a, 102b . . . 102n, a processor 106 and a memory controller 104. The plurality of memory devices 102a, 102b . . . 102n are primary memory devices (i.e. a part of main memory directly accessible by the processor) which is connected to the processor 106 of the computing device 100. The plurality of memory devices 102a, 102b . . . 102n may be a RAM such as dynamic RAM (DRAM), static RAM (SRAM), Synchronous Dynamic RAM (SDRAM), Single Data Rate Synchronous Dynamic RAM (SDR SDRAM), Double Data Rate Synchronous Dynamic RAM (DDR SDRAM) etc or a ROM, a flash memory, register bank or any other kind of primary memory devices. Each memory device among the plurality of memory devices 102a, 102b . . . 102n may be the same type of memory device or a different type of memory device from the examples given above.

The operating systems running on the processor 106 in the computing device 100 performs various memory operations on a memory device while operating. In other words when a command is run the operating system reads data from the memory device or writes data into the memory device based on the command.

The memory controller 104 manages the flow of data going to and from the plurality of memory devices 102a, 102b . . . 102n. The memory controller 104 comprises various modules and interfaces for managing the plurality of memory devices 102a, 102b . . . 102n. The memory controller 104 provides the correct memory control signals, connections and timing for each memory device among the plurality of memory devices 102a, 102b . . . 102n.

As discussed above, each memory device may be in a normal mode or a power save mode depending on whether the memory device is operable or inoperable at a certain point in time. Thus, when the memory device is functioning i.e. active, the memory device remains in a normal mode and when the memory device becomes inactive for a certain period, the memory device enters into a power save mode such as self-refresh mode, sleep mode, standby mode, low power mode, ultra-low power mode, etc in order to reduce the power consumption. In some examples, the switching of the memory device from a normal mode to a power save mode is a fixed function of the memory controller, and in other examples can be programmed by a programmer or set by a user.

For example, the programmer can program the memory controller to initiate the memory to go into a power save mode when the memory is inactive or idle for a particular time period. In another example, a user can set the settings of the computing device to initiate a power save mode such as a sleep mode or a standby mode when the computing device (and so the memory) is inactive for a particular time period such as 5 minutes or 10 minutes.

The memory controller 104 comprises a set of control lines or pins connected to each memory device to set the memory device in various power modes. The set of control pins may include a normal mode control pin, a power save mode control pin, a shutdown control pin and the like. In one example, the memory controller may set the normal mode control pin of a memory device high when the computing device is switched on. The memory controller 104 sets the shutdown control pin when the computing device is switched off or shut down. Similarly, the memory controller 104 sets the power save mode control pin high when the memory remains in an inactive state for a time period or based on the settings. Other mechanisms for setting these modes will be apparent to the skilled person, such as setting control lines/pins low rather than high, or encoding control signals with fewer lines/pins (e.g. setting normal or power save mode based on whether a single control line was low or high).

Figure 2A:
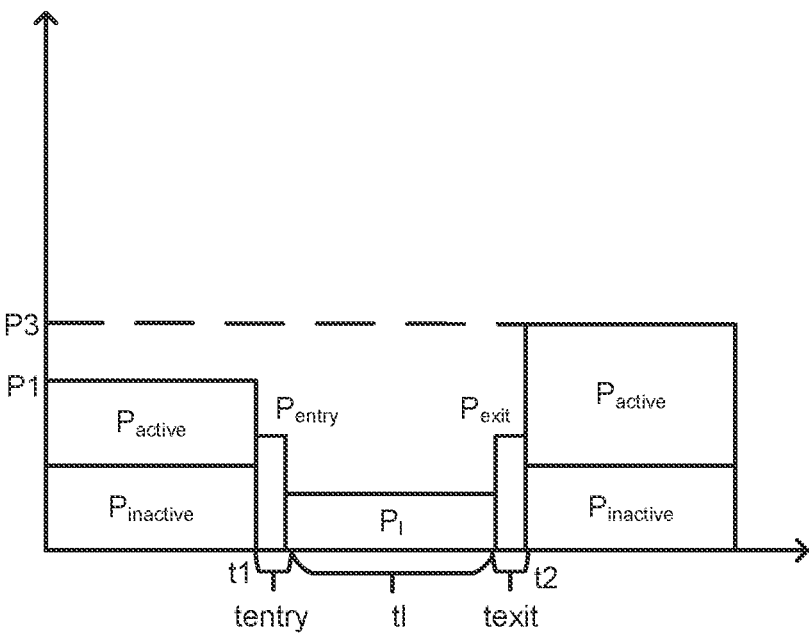
FIG. 2A illustrates power consumed by the memory device when entering a power save mode.

FIG. 2A is an exemplary illustration of power consumed by a memory device entering a power save mode when the memory device is inactive for a certain duration. For example, consider a case when the memory device 102b is active. In other words, consider that the memory device is operable and the processor is carrying out various memory operations in the memory device 102b. The memory controller 104 sets the memory device 102b to work in the normal mode 202 by setting the normal mode control pin for the memory device 102*b* high. During the normal mode, the memory device 102*b* consumes a first amount of power P1 for a time period t1 to perform various memory operations as shown in FIG. 2A. The first amount of power P1 comprises an active power (P*active*) for performing the operations in addition to an inactive power (P*inactive*) which is the power drawn by the transistors by default (or the power drawn by the leakage current flowing through the transistors).

Further, when the processor completes carrying out the memory operations on the memory device 102*b*, the memory device 102*b* may become inactive or idle for a time period, for example, t2-t1. In such a case, the memory controller 104 may set the power save mode control pin high to trigger the memory device 102*b* to go to the power save mode 204 based on the settings of the computing device or as is programmed by a programmer. When the power save mode is triggered, as shown in FIG. 2A memory device 102*b* may consume a second amount of power (P2). The memory device working in the power save mode 204 consumes a low power (P*l*). The memory device 102*b* would consume, in addition to the low power (P*l*), a power (P*entry*) to enter into the power save mode and a power (P*exit*) to exit from the power save mode 204. Thus, during a power save mode, the computing device 100 consumes power, $$P2 = P_{entry}*t_{entry} + P_l*t_l + P_{exit}*t_{exit}$$

where t*entry* is the time period taken to enter into the power save mode, t*l* is the time period in which the memory device remains in the power save mode and t*exit* is the time period taken to exit the power save mode.

Further, when the computing device 100 is activated, the memory device 102*b* becomes operable again. The memory controller 104 then switches the memory device 102*b* back to the normal mode by setting the normal mode control pin high. In the normal mode, the memory device 102*b* consumes a third amount of power (P3) which includes active power (P*active*) for performing the operations and an inactive power (P*inactive*). The inactive power (P*inactive*) is static or is the same for the memory device though out the lifetime. However, the active power (P*active*) is dynamic and depends on the operations performed by the memory device 102*b*. The first amount of power and the third amount of power may be the same or different based on the operations performed by the memory device 102*b*.

Figure 2B:
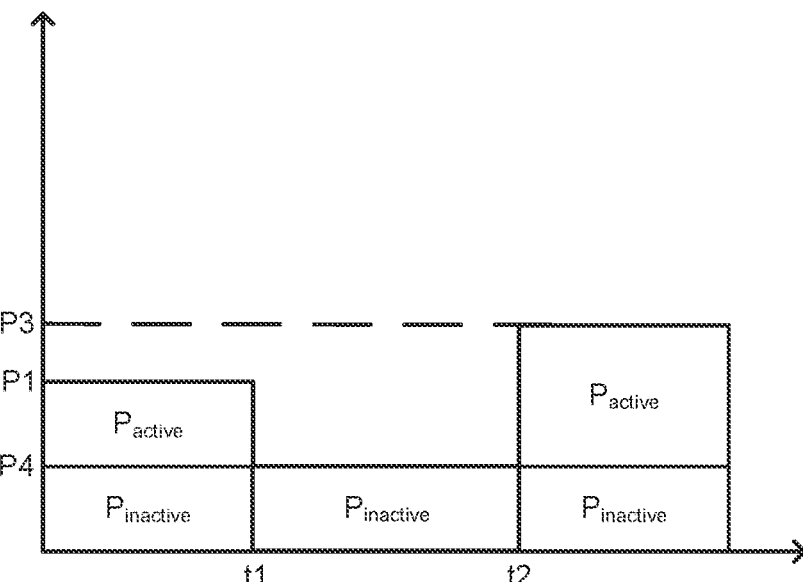
FIG. 2B illustrates power consumed by the memory device when not entering a power save mode.

FIG. 2B is an exemplary illustration of power consumed by a memory device not entering a power save mode when inactive. The memory device 102*b* operates in the normal mode 202 until time t1 as explained with reference to FIG. 2A. Thus, the memory device would consume a first amount of power P1 for a time period t1 when the memory device is operable i.e. when performing the memory operations. The first amount of power P1 comprises an active power (P*active*) and an inactive power (P*inactive*) as explained earlier.

Further, when the processor completes carrying out the memory operations, the memory device 102*b* may become inactive or idle for a time period, for example, up to time t2. Therefore, the memory device 102*b* is inactive for a time period t2-t1. The memory controller 104, based on the settings of the computing device or as is programmed by a programmer, may not initiate a power save mode. Hence, when the memory is inactive, the memory remains in the normal mode. Though the memory device is in normal mode, the memory device does not consume any active power as the memory device is not performing any memory operations but consumes only an inactive power due to the leakage current through the transistors. Hence the memory device consumes a fourth amount of power (P4) which is the same as the inactive power (P*inactive*) for the time period t2-t1.

When the computing device is activated, the memory device again becomes operable and continue to remain in normal mode. As explained above, in normal mode, the memory device consumes a third amount of power (P3) which includes active power (P*active*) for performing the operations and an inactive power (P*inactive*). The first amount of power and the third amount of power may be the same or different depending on the active power consumed by the memory device 102*b*.

Thus, the total power consumption when memory device is inactive is $$P4 = P_{inactive}*(t2 - t1)$$
$$= P_{inactive}*(t_{entry} + t_l + t_{exit})$$

Where t*entry* is the time period taken to enter into the power save mode, t*l* is the time period in which the memory device remains in the power save mode and t*exit* is the time period taken to exit the power save mode.

Typically, the power save mode of the memory device can be turned on in the settings or programmed such that the memory device enters power save mode when the memory is inactive/idle. However, though power save mode is intended to save power consumed by the computing device, some power (P2) is consumed when the memory devices switch to a power save mode from a normal mode and then later switch back to normal mode when the memory device becomes active again. Hence switching to a power save mode would not be beneficial if more overall power is consumed while switching to the power save mode and back to the normal mode rather than staying in the normal mode. Switching to a power save mode could benefit power consumption only if the memory remains in the power save mode for a period longer than a threshold to compensate for the additional power consumed while switching from one mode to another.

Described herein is a method and system for controlling the memory device to switch to a power save mode dynamically, thereby efficiently reducing the power consumption of the computing device. By keeping track of one or more previous inactive periods of memory device, statistics can be gathered regarding how the memory device is being used and a prediction made regarding a forthcoming inactive period. In particular, based on the statistics, the memory device can be controlled to enter a power save mode or not during an inactive period selectively to thereby reduce the overall power consumption. This can be achieved by learning the time spent in one or more prior inactive periods, and calculating a metric based on a measure of the time spent in a power save mode by the memory device in these prior periods. This metric can be further used to identify if the memory is likely to remain in the power save mode for a duration long enough to reduce the power consumption of the memory device in future inactive periods. If so, the memory device is controlled to enter a power save mode for the duration of the next inactive period or else the memory device is controlled to remain in the normal mode during the inactive period. In the examples described herein "during" or "for the duration of" the inactive period is intended to mean throughout the inactive period, i.e. the whole/entirety of the inactive period.

To perform this method, the metric is compared to a threshold, which may be known as a breakeven threshold. The threshold is calculated based on the duration of time above which the power consumed by the memory device in power save mode while in the inactive period saves power compared to remaining in the normal mode.

For example, when P4>P2

$$P_{inactive}*(t_{entry}+t_I+t_{exit})>P_{entry}*t_{entry}+P_I*t_I+P_{exit}*t_{exit}$$

Therefore, $\quad t_{threshold}=t_I=[P_{entry}*t_{entry}+P_{exit}*t_{exit}-P_{inactive}*(t_{entry}+t_{exit})]/(P_{inactive}-P_I)$ (1)

Figure 3:
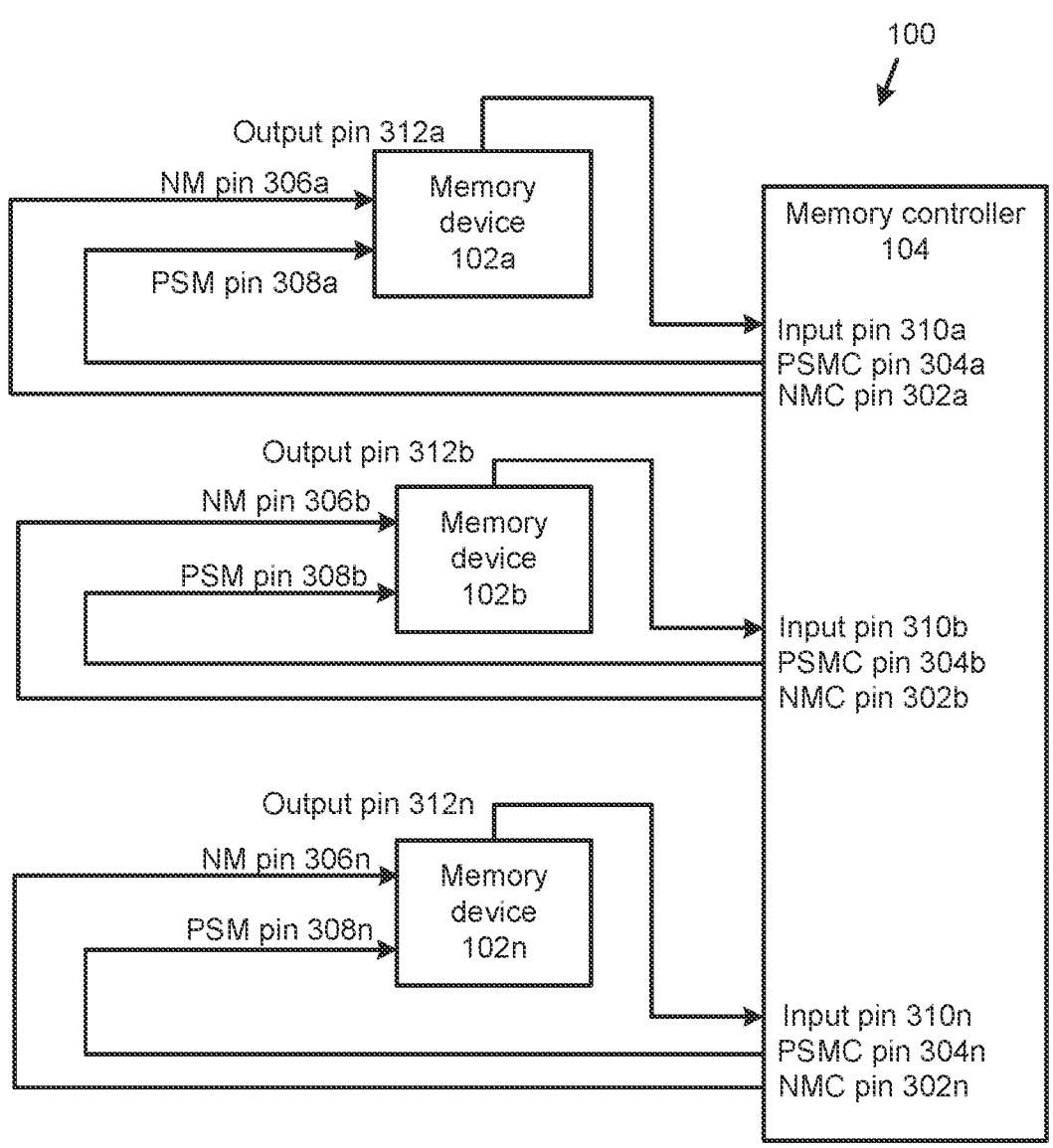
FIG. 3 is a block diagram the computing device.

FIG. 3 illustrates the computing device 100, comprising the memory controller 104 connected to a plurality of memory devices 102a, 102b . . . 102n. The memory controller 104 is also connected to the processor (not shown in the figure). The memory devices among the plurality of memory devices 102a, 102b . . . 102n may be the same type of memory device or different types of memory devices. In one example all the memory devices among the plurality of memory devices 102a, 102b . . . 102n may be an SRAM. In another example, all the memory devices among the plurality of memory devices 102a, 102b . . . 102n may be a DRAM. In yet another example, each memory device among the plurality of memory devices 102a, 102b . . . 102n may be one of RAM or a ROM or flash memory or any other kind of primary memory device.

As explained earlier, the memory controller 104 comprises a set of control pins connected to each memory device to control the working modes of the memory device. In other words, the set of control pins is used to provide appropriate signals to the memory devices so as to set the memory devices to work in various power modes. The set of control pins may include a plurality of Normal Mode Control (NMC) pins 302a, 302b . . . 302n, a plurality of Power Save Mode Control (PSMC) pins 304a, 304b . . . 304n, a Shutdown Control (SDC) pin (not shown in the figure) and the like. Each memory device also comprises a set of pins for receiving commands from the memory controller 104 such as a Normal Mode (NM) pin 306n and/or a Power Save Mode (PSM) pin 308n.

For example, consider the memory controller 104 controlling the memory device 102a. The memory controller sets the NMC pin 302a connected to an NM pin 306a of the memory device 102a high, to control the memory device to go into a normal mode. Further, the memory controller 104 sets the PSMC pin 304a connected to a PSM pin 308a of the memory device 102a high, to control the memory device to go into a power save mode. Similarly, each memory device among the plurality of memory devices 102a, 102b . . . 102n can be controlled by the corresponding control pins connected to each of the memory devices. The memory controller 104 sets the SDC pin when the computing device is off or shut down.

Now when the computing device is switched on and applications are running, the memory controller 104 sets the memory devices among the plurality of memory devices 102a, 102b . . . 102n to work in the normal mode by setting the signal at the NMC pin connected to the NM pin of each the memory device high. Thus, the memory devices would be active/operable. The memory devices on which the processor 106 is carrying out various memory operations would remain active. When the processor 106 completes carrying out the memory operations on the memory device, the memory device may become inactive or idle for a time period.

The memory controller 104 may receive signals from each memory device indicating whether the particular memory device is active or inactive. In one example, the information regarding whether the memory device is active or inactive can be fed to an input pin of the memory controller 104 via an output pin of the memory device. The information received from each memory device may be used by the memory controller 104 to dynamically control the corresponding memory device.

The memory controller 104 determines a metric based on the time spent by the memory device in at least one previous inactive period. The metric may be a statistic that relates to the time spent in one or more consecutive previous inactive periods. The various methods of calculating the metric are provided in detail below. Further, the memory controller 104 compares the metric with a threshold. The threshold is a predetermined fixed value or a value programmed by the user. Further, the memory controller, based on the comparison generates an output decision using which the memory controller controls the memory device.

If, while comparing the metric with the threshold, it is determined that the metric is lower than the threshold, the memory controller causes the memory device to remain in the normal mode during an inactive period. The memory controller would generate an output decision to retain the value at the NMC pin high thereby retaining the memory device in normal mode. Whereas if, while comparing the metric with the threshold, it is determined that the metric is greater than the threshold, the memory controller causes the memory device to switch to a power save mode during the inactive period. The memory controller would generate an output decision to set the value at the PSMC pin high thereby switching the memory device to enter the power save mode. Thus, based on the metric determined, the memory device is controlled dynamically. Clearly, in alternative examples, the thresholds and comparisons can be adapted so that the decision to remain in the normal mode is based on whether the metric is higher than the threshold and vice versa for switching to the power save mode, without changing the effect obtained.

Figure 4:
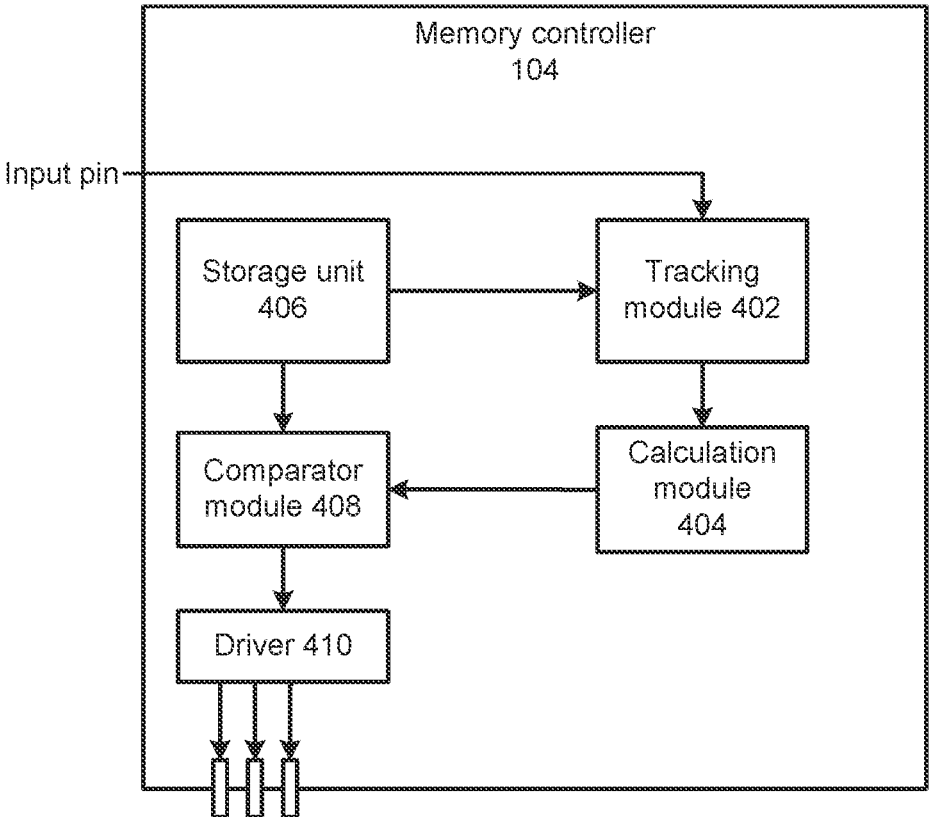
FIG. 4 is a block diagram of a memory controller.

The functional block diagram of the memory controller 104 is explained based on FIG. 4. The memory controller, in one implementation, comprises a tracking module 402, a calculation module 404, a storage unit 406, a comparator module 408 and driver 410. The tracking module 402 is configured to keep track of one or more inactive periods of each memory device from the information obtained from the memory devices. As discussed, the information from the memory device may be obtained via the output pin of the memory device. The tracking module 402, in a simple example, is a counter to count the number of clock cycles in each inactive period. Alternatively, the tracking module can comprise more complex functions to track the inactive periods of the memory device. The number of previous inactive periods that are tracked can be fixed, predefined by the programmer or can be chosen dynamically.

The storage unit 406 is configured for storing operational parameters including a tracking depth indicating the number of previous inactive periods to be tracked, the threshold value, and the like. The storage unit 406 may comprise one or more registers/any other memory. The threshold value can be fixed for a memory device or can be a programmable threshold that can be programmed by a programmer. The number of inactive periods to be tracked may be determined based on simulation, experiments, and measurements of various aspects of memory devices. Therefore, this number may vary based on the type of memory device. Thus, the tracking module receives the tracking depth from the storage unit 406 and tracks the number of inactive periods indicated by the tracking depth. The tracked information is further provided as an input to a calculation unit 404.

The calculation module 404 is configured to determine the metric based on the output of the tracking module such as the number of clock cycles in one or more previous inactive periods or the total time spent by the memory device in one or more inactive periods. The metric may be calculated by various methods which are explained in detail below. The calculated metric is provided as a first input to the comparator module 408. The comparator module also receives the threshold value from the storage unit 406 as a second input.

The comparator module 408 is configured for comparing the calculated metric with the threshold. The threshold may be a predetermined breakeven time explained above, or may be a value related to such a time (such as a threshold/ breakeven clock cycle count). In one example the threshold can be calculated by the equation (1) provided above. The predetermined threshold in another example can be a threshold power consumed. Once the calculated metric is compared with the threshold, based on whether the calculated metric is greater than or less than the threshold, an output decision is generated. The generated output decision is provided to the driver 410.

The driver 410 is configured to drive each memory device by setting the PSMC pin dynamically based on the output decision generated based on the comparison. For example, the driver 410 in response to determining that the metric is less than the predetermined threshold drives/controls the memory device to remain in the normal mode during the inactive periods.

In one example, the tracking module 402 is a counter. Consider an example in which the predetermined threshold is a threshold time calculated based on the above equation (1). Let the threshold time be 10 ns. The threshold time is stored in the storage unit 406. Now assume that the number of previous inactive periods to be tracked is set as 5 and is stored in the storage unit 406. The tracking module 402 in the memory controller receives the information from each memory device and the storage unit 406 and keeps tracking and storing the duration of the 5 most recent inactive periods of the memory device. In this illustrative example, the 5 most recent inactive periods of the memory device 102*a* tracked are 5, 10, 5, 10, 10 cycles counted by a 500 MHz clock (i.e. clock period is 2 ns) respectively.

The tracking module 402, provides the tracked data regarding the 5 inactive periods as an input to the calculation module 404. The calculation module 404 calculates a metric based on the data tracked. In one example the metric is the total time period spent in 5 inactive periods. This is a simple method and is called a sum method. Thus, the total time period spent in 5 inactive periods are obtained by calculating as follows:

$$\text{Time spent over 5 inactive periods} = (5+10+5+10+10) \times 2 \text{ ns} = 80 \text{ ns}$$

The calculation module 404 provides the calculated metric to the comparator module 408 as the first input. The comparator module 408 also receives the predetermined threshold from the storage unit 406 as the second input. The comparator compares the calculated metric with the predetermined threshold to generate a decision to output to the driver 410. If the time spent over 5 inactive periods is greater than 5 times of the threshold time, then the controller generates an output decision on whether to activate power save mode during the following inactive periods. In this example as the time spent over 5 inactive periods (80 ns) is greater than 5 times the threshold time (5×10 ns), the controller activates power save mode during the inactive periods. Note that in this illustrative example absolute values for time are calculated (in ns). However, in some implementations this is not necessary, and it is possible to simply compare the clock cycle counts. For example, the threshold can be set already taking this into account, say as 25 clock cycles (5×10 ns=5×5 clock cycles at 500 MHz). The implementation then becomes a simple comparison between the tracking count (40 above) and the threshold (25 above) to decide the mode for the memory.

The comparator module 408 sends the output decision to the driver 410. The driver 410 in this example based on the decision enables the activation of the PSMC pin 304*a* for the first memory device. Thus, when the next inactive period for the first memory device is encountered, the PSMC pin can be asserted, which triggers the power save mode of the memory device in for that inactive period. If the opposite had been decided by the comparator module 408, then the activation of the PSMC pin would be disabled by the driver, so that the memory cannot be placed in the power save mode, and would instead remain in the normal mode in the next inactive period.

The calculation module 404 calculating the metric can be implemented using various fixed function circuitry. Alternatively, or in addition to, the sum method above, the calculation module can be implemented to calculate the metric by using other methods such as a weighted sum, an exponential sum, a mean, a median, a mode, a max, a min, a linear forecast, pattern matching etc.

In a weighted sum method, compared to the example given above for calculating the metric using a sum method, each tracked duration or clock cycle count for a prior inactive period provided to the calculation unit is multiplied by a weight stored in the storage unit and all the weighted durations or counts are summed to obtain the metric. The weighted sum method may also be called a weighted linear combination or simple additive weighting. In the weighted sum method, the durations or clock cycle counts for more recent inactive periods are multiplied with a larger weight and the less recent inactive periods are multiplied with a comparatively lesser weight. The metric is further compared in the comparator with the threshold to generate an output decision provided to the driver. A weighted sum can be used to ensure that the most recent tracked inactive periods are given more influence over the prediction decision than ones that are older. In some examples, the weights can be selected so that they sum to a value of 1, thereby giving a weighted average. For example, when tracking five previous inactive periods, weights of 0.3, 0.25, 0.2, 0.15 and 0.1 may be selected (to apply from most to least recent).

In another implementation, an exponential sum method may be used to calculate the metric by the calculating unit. Each tracked duration or clock cycle count for a prior inactive period provided to the calculation unit is multiplied by a weight stored in the storage unit and all the weighted durations or counts are summed to obtain the metric. In the exponential sum method, the durations or clock cycle counts for more recent inactive periods may be multiplied with a larger weight and the less recent inactive periods are multiplied with a comparatively lesser weight, where the weights vary exponentially. The metric is further compared in the comparator with the threshold to generate an output decision provided to the driver. An exponential sum is therefore very similar to the weighted sum, but is skewed to place an even greater emphasis on the most recent tracked inactive periods compared to older ones. As above, the exponential weights may be selected to sum to 1 to give an exponential average.

In yet another implementation, a mean or average method may be used to calculate the metric by the calculating unit. The durations or clock cycle counts from the predefined number of prior inactive periods tracked by the tracking unit are provided to the calculation unit. The calculation unit calculates the average by summing the values of from each of the inactive periods provided and dividing by the number of periods to obtain the metric. The metric is further compared in the comparator with the threshold to generate an output decision provided to the driver.

In yet another implementation, a median method may be used to calculate the metric by the calculating unit. The median is the value separating the higher half from the lower half of a data sample among a predefined number of data samples. The durations or clock cycle counts from the predefined number of prior inactive periods tracked by the tracking unit are provided to the calculation unit. The calculation unit sorts the values from the prior inactive periods into increasing (or decreasing) order and calculates the median either by choosing the middle value for an odd number of values obtained or calculates the sum of two central values from an even number of values and divides by 2 to obtain the metric. The metric is further compared in the comparator with the threshold to generate an output decision provided to the driver.

In yet another implementation, a mode method may be used to calculate the metric by the calculating unit. The mode is the value that appears most often in a set of data samples. The durations or clock cycle counts from the predefined number of prior inactive periods tracked by the tracking unit are provided to the calculation unit. The calculation unit identifies the mode as the value from the prior inactive periods which appears most frequently. The metric is further compared in the comparator with the threshold to generate an output decision provided to the driver.

In yet another implementation, a max or a min method may be used to calculate the metric by the calculating unit to obtain the metric. The min or max method would be the simplest method to implement in hardware and require the smallest amount of data storage. To implement the max method, the tracking unit provides the duration or count from a prior inactive period to the calculating unit. The calculating unit compares the value to the previously stored maximum or minimum value. If the received value is larger (for max) or smaller (for min) it overwrites the stored value. The stored max or min value is used as the metric.

Yet other methods such as a forecast may be used to estimate how long the next inactive period of the memory device will be to come to a decision whether it is worth to switch the memory device to a power save mode. This operates by using the previous inactive period counts or durations to extrapolate an estimate the duration or count for the next inactive period. The extrapolation may be based on a linear extrapolation, or a more complex function if this more accurately models the memory usage patterns.

Yet another method such as pattern matching can be used as a metric. For example, a set of memory usage workloads for the computing device can be recorded and pre-analysed. From these memory usage workloads a smaller subset of patterns can be found in which similar usage of the memory is seen. The patterns can be stored in the storage unit. The tracking unit can then provide the values for the durations or counts for the previous inactive periods to the calculation unit, and the calculation unit attempts to find the closet matching pattern. The closest matching pattern is then used to predict the count or duration for the next inactive period, and used to generate an output decision.

As will be apparent, any other type of statistical metric can also be used as appropriate to estimate whether the next inactive period is likely to be sufficiently long to be worthwhile entering the power save mode. The statistical metric selected may be based on knowledge of the characteristics of a given memory device or the known use (i.e. workloads) of the memory device by the computing device.

The comparator module 408 sends the output decision generated based on the metric calculated by the calculation unit to the driver 410. The calculation unit can use any of the methods cited above or any other methods to calculate the metric. The driver 410 based on the output decision generated for each memory device, controls the memory device to go into a power save mode or not during the next inactive time period thereby efficiently reducing the power consumption of the computing device.

Thus, in one example, tracking, calculation, comparison and decision making happen for every inactive period of the memory. Alternatively, these steps for decision making may also happen less frequently, such as in a specific interval as programmed by the programmer. Whilst the steps of calculation and comparison may consume very small amounts of additional power when generating an output decision, the method still makes the power consumption more efficient.

The memory controller may be implemented as a fixed function circuitry on an integrated circuit. The memory controller in that case is a dedicated hardware and may be integrated as a part of an SoC or a memory device (such as DRAM). In another implementation, the operation of the functional blocks of the memory controller 104 can be achieved by running a software program run on a microcontroller within the computing device (such as in the memory controller). In another example, the operation of the functional blocks of the memory controller 104 can be achieved by running a software program run on the CPU of the computing device. In another implementation, the functional blocks of the memory controller can be implemented as a combination of hardware and software.

Figure 5:
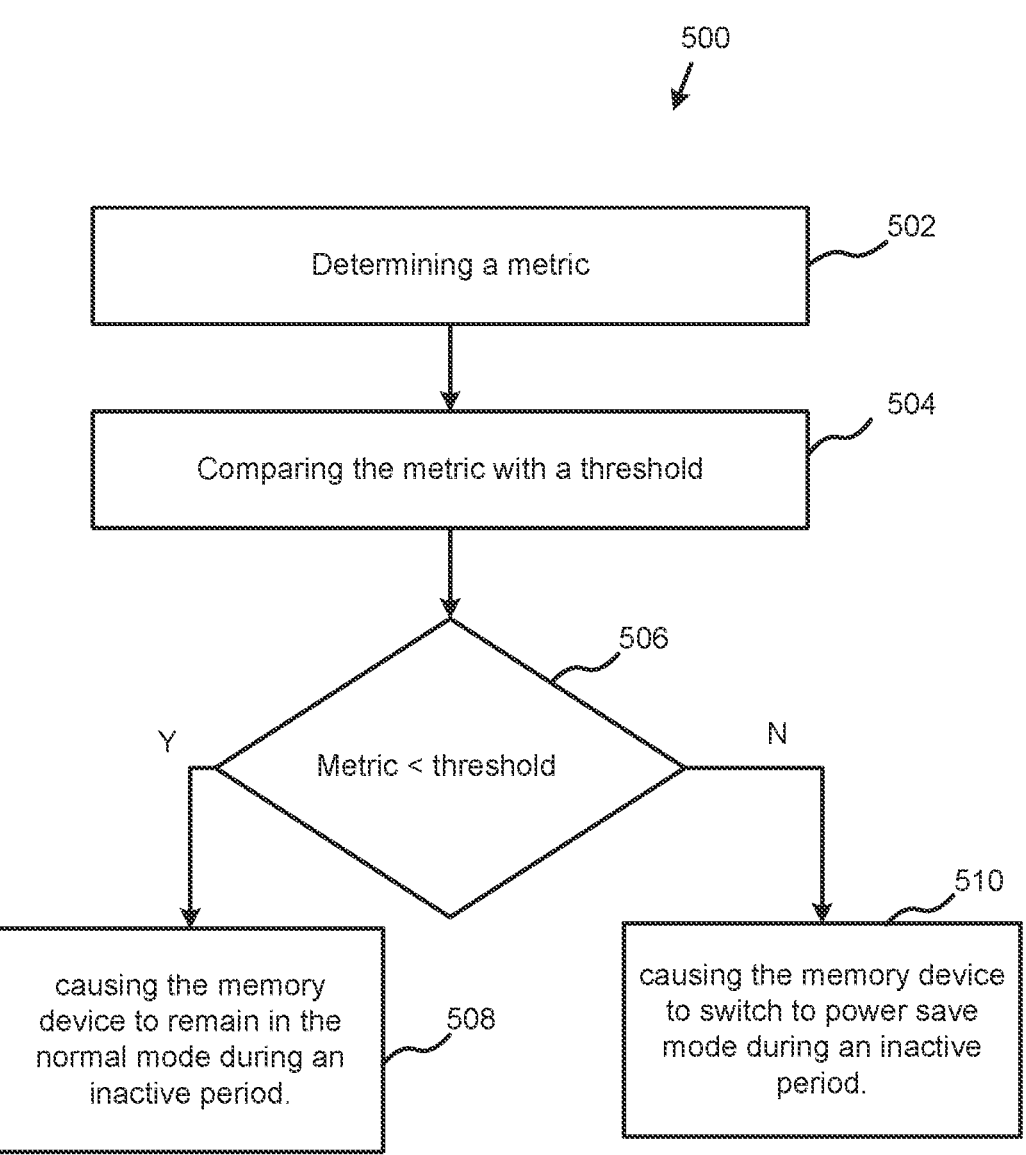
FIG. 5 is a flowchart explaining the method of controlling the memory device.

FIG. 5 illustrates the method of controlling a memory device in a computing device. The memory device may be a DRAM, an SRAM, an SDRAM, a ROM, a register bank, or a flash memory or any other kind of primary memory devices. The memory device works in various modes of operation. In a normal mode the memory device is operable. Further in a power save mode the memory device is inoperable and consumes lower power than the normal mode. The power save mode is one of a self-refresh mode, sleep mode, standby mode, low power mode, and ultra-low power mode.

The method includes, in step 502, determining a metric based on the time spent in a power save mode by the memory device for at least one inactive period. The metric is a statistic and can be determined by a calculation unit in the memory controller. In order to determine the metric, at least one previous inactive period of the memory device is tracked. The previous inactive period can be tracked for example by counting the number of clock cycles that the memory was in an inactive state. Once a predefined number of inactive periods are tracked, the calculation of the metric can be performed using any one of the methods such as sum, weighted sum, mean, median, mode, min, max, pattern matching and the like.

Further, the method includes, at step 504, comparing the metric with a threshold. The metric is compared to the threshold stored in a storage unit such as registers. The threshold may be a breakeven time or count above which use of power save mode efficiently reduces the power consumption. The threshold can be fixed (hardcoded), configurable by a designer, or can be programmable by a user.

Thus, the method includes, at step 506, comparing the calculated metric with the threshold (e.g. by determining whether the calculated metric is less than the threshold). If yes, the method at step 508 includes causing the memory device to remain in the normal mode during the next inactive period. If no, i.e. the metric is greater than the threshold, the method includes at step 510, causing the memory device to switch to the power save mode during the next inactive period.

Figure 6:
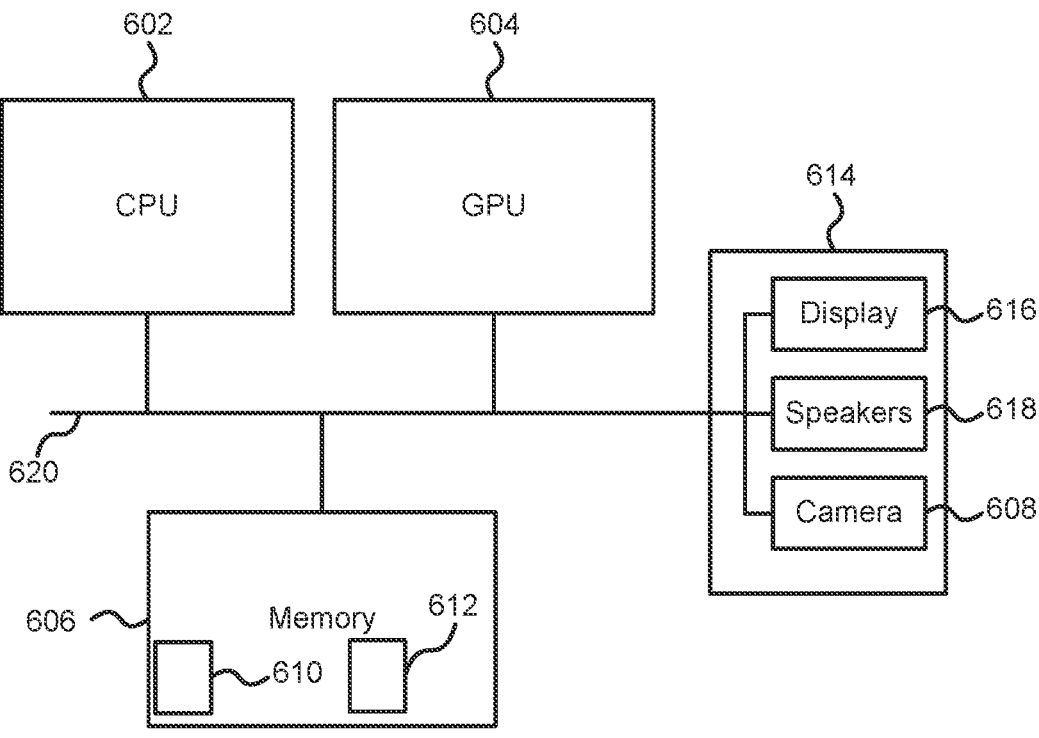
FIG. 6 shows a block diagram of a computer system.

FIG. 6 shows a computer system in which the computing device described herein may be implemented. The computing device comprises a CPU 602, a GPU 604, a memory block 606 and other devices 614, such as a display 616, speakers 618 and a camera 608. The components of the computer system can communicate with each other via a communications bus 620. The memory block 606 may comprise a memory 610 (such as memory 102*a-n* from as described with reference to FIG. 1) and a memory controller 612 (such as memory controller 104 described with reference to FIG. 1).

The computing device 100 of FIGS. 1 and 3 are shown as comprising a number of functional blocks. This is schematic only and is not intended to define a strict division between different logic elements of such entities. Each functional block may be provided in any suitable manner. It is to be understood that intermediate values described herein as being formed by computing device 100 need not be physically generated by the computing device 100 at any point and may merely represent logical values which conveniently describe the processing performed by computing device 100 between its input and output.

The computing device 100 described herein may be embodied in hardware on an integrated circuit. The computing device 100 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a Random Access Memory (RAM), Read Only Memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a computing device 100 configured to perform any of the methods described herein, or to manufacture a computing device 100 comprising any apparatus described herein. An integrated circuit definition dataset may be, for example, an integrated circuit description.

Therefore, there may be provided a method of manufacturing, at an integrated circuit manufacturing system, a computing device 100 as described herein. Furthermore, there may be provided an integrated circuit definition dataset that, when processed in an integrated circuit manufacturing system, causes the method of manufacturing a computing device 100 to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computing device 100 will now be described with respect to FIG. 7.

Figure 7:
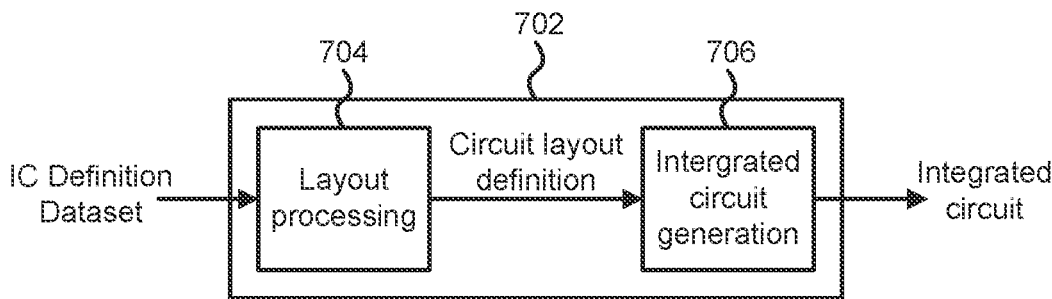
FIG. 7 shows an integrated circuit manufacturing system.

FIG. 7 shows an example of an integrated circuit (IC) manufacturing system 702 which is configured to manufacture a computing device 100 as described in any of the examples herein. In particular, the IC manufacturing system 702 comprises a layout processing system 704 and an integrated circuit generation system 706. The IC manufacturing system 702 is configured to receive an IC definition dataset (e.g. defining a computing device 100 as described in any of the examples herein), process the IC definition dataset, and generate an IC according to the IC definition dataset (e.g. which embodies computing device 100 as described in any of the examples herein). The processing of the IC definition dataset configures the IC manufacturing system 702 to manufacture an integrated circuit embodying computing device 100 as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture computing device 100 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description, it will be evident to a person skilled in the art that various modifications may be made within the scope of the invention.

What is claimed is:

1. A method of controlling a memory device, the memory device having a normal mode in which the memory device is operable to perform operations including having data read from it and having data written to it, and a power save mode in which the memory device is inoperable and consumes lower power than the normal mode, the method comprising:

determining a metric based on the time spent by the memory device in at least one previous inactive period;

comparing the metric with a threshold; and in response to determining that the metric is lower than the threshold, causing the memory device to remain in the normal mode throughout a subsequent inactive period.

2. The method according to claim 1, wherein causing the memory device to remain in the normal mode throughout a subsequent inactive period comprises causing the power save mode to be disabled, so that the memory device cannot be placed in the power save mode and instead remains in the normal mode in the subsequent inactive period.

3. The method according to claim 1, further comprising in response to determining that the metric is greater than the threshold causing the memory device to enter the power save mode throughout the subsequent inactive period.

4. The method according to claim 1, wherein the threshold is stored in a storage unit, and the threshold is predetermined or programmable.

5. The method according to claim 1, further comprising tracking a measure of the time spent during the at least one previous inactive period.

6. The method according to claim 5, wherein the measure of the time spent during the at least one previous inactive period is a count of the number of clock cycles spent in the at least one previous inactive period.

7. The method according to claim 5, wherein a tracking depth is stored indicating how many previous inactive periods are to be tracked to determine the metric.

8. The method according to claim 5, wherein the metric is based on the time spent by the memory device in a plurality of previous inactive periods and determining the metric comprises at least one of:

a sum of the measures of the time spent in the previous inactive periods;

a weighted sum of the measures of the time spent in the previous inactive periods;

an exponential sum of the measures of the time spent in the previous inactive periods;

a mean of the measures of the time spent in the previous inactive periods;

a median of the measures of the time spent in the previous inactive periods;

a mode of the measures of the time spent in the previous inactive periods;

a maximum of the measures of the time spent in the previous inactive periods;

a minimum of the measures of the time spent in the previous inactive periods;

an extrapolated forecast from the measures of the time spent in the previous inactive periods; and a pattern match between the measures of the time spent in the previous inactive periods and a stored plurality of predetermined memory access patterns.

9. The method according to claim 1, wherein comparing the metric with the threshold is performed each time the memory device is to enter an inactive state.

10. A non-transitory computer readable storage medium having stored thereon computer readable code configured to cause the method as set forth in claim 1 to be performed when the code is run.

11. A memory controller for controlling a memory device, the memory device having a normal mode in which the memory device is operable to perform operations including having data read from it and having data written to it, and a power save mode in which the memory device is inoperable and consumes lower power than the normal mode, the memory controller comprising:

a calculation module configured to determine a metric based on the time spent by the memory device in at least one previous inactive period;

a comparator configured to compare the metric with a threshold; and a driver configured to, in response to determining that the metric is lower than the threshold, cause the memory device to remain in the normal mode throughout a subsequent inactive period.

12. The memory controller according to claim 11, wherein the driver is configured to, in response to determining that the metric is lower than the threshold, cause the memory device to remain in the normal mode throughout a subsequent inactive period by causing the power save mode to be disabled, so that the memory device cannot be placed in the power save mode and instead remains in the normal mode in the subsequent inactive period.

13. The memory controller according to claim 11, wherein the driver is further configured to, in response to determining that the metric is greater than the threshold, cause the memory device to enter the power save mode throughout the subsequent inactive period.

14. The memory controller according to claim 11, further comprising a tracking module configured to track a measure of the time duration in the at least one previous inactive period.

15. The memory controller according to claim 14, wherein the measure of the time spent during the at least one previous inactive period is a count of the number of clock cycles spent in the at least one previous inactive period.

16. The memory controller according to claim 14, wherein the tracking module tracks the time spent by the memory device for a number of inactive periods indicated by a tracking depth stored in a storage module.

17. The memory controller according to claim 14, wherein the calculation module determines the metric based on the measure of the time duration in the at least one previous inactive period tracked by the tracking module.

18. The memory controller according to claim 11, wherein the memory controller is embodied in fixed function circuitry on an integrated circuit.

19. A method of manufacturing a memory controller as set forth in claim 11, comprising inputting a computer readable dataset description of said memory controller into an integrated circuit manufacturing system, and causing said integrated circuit manufacturing system to manufacture said memory controller in accordance with said computer readable dataset description.

20. A non-transitory computer readable storage medium having stored thereon a computer readable dataset description of a memory controller as set forth in claim 11 that, when processed in an integrated circuit manufacturing system, causes the integrated circuit manufacturing system to manufacture an integrated circuit embodying the memory controller.

* * * * *